Oct. 18, 1938.　　　　J. NEUFELD　　　　2,133,786
METHOD OF AND APPARATUS FOR DETERMINING THE DIP OF THE EARTH'S SUBSTRATA
Filed May 7, 1937　　　2 Sheets-Sheet 1

INVENTOR

Jacob Neufeld

Oct. 18, 1938.   J. NEUFELD   2,133,786
METHOD OF AND APPARATUS FOR DETERMINING THE DIP OF THE EARTH'S SUBSTRATA
Filed May 7, 1937   2 Sheets-Sheet 2

INVENTOR
Jacob Neufeld

Patented Oct. 18, 1938

2,133,786

UNITED STATES PATENT OFFICE 2,133,786

METHOD OF AND APPARATUS FOR DETERMINING THE DIP OF THE EARTH'S SUBSTRATA

Jacob Neufeld, Tulsa, Okla., assignor to Engineering Laboratories, Inc., Tulsa, Okla., a corporation of Oklahoma Application May 7, 1937, Serial No. 141,362

6 Claims. (Cl. 175—182)

This invention relates to a method and apparatus for conducting investigations inside of bore or drill hole and has special application in connection with the determination of slope and dip of various strata penetrated by oil wells, water wells, and the like.

By slope of a stratum in a given plane is meant the angle which the intersection of the stratum with the plane makes with respect to a horizontal plane. By dip is meant the angle which the line of maximum slope of a stratum makes with the horizontal plane. Thus the angle of slope measured in any plane would be obviously less than the angle of dip.

The problem which consists in determining the direction and azimuth of the dip of the beds traversed by a drill hole is of a great practical interest. The value and knowledge of the dip is evident not only in wildcat wells and core drill holes to determine structure, but in proven areas to determine when wells have passed through faults or crossed the axes of asymmetrical anticlines into areas from which they should be deflected.

When a vertical hole is drilled in sedimentary rock, the examination of the cores recovered usually gives with sufficient accuracy the angle of the dip of the beds traversed, that is the maximum angle of inclination to the horizontal plane. It is difficult to determine, however, the direction and the azimuth of the dip, that is, the azimuth in relation to the north, in which is situated the line of greatest slope of the beds, and the direction which must be taken in order to descend this slope. For this determination it is necessary to recover cores oriented in relation to a given vertical plane—the north-south plane for example—and this operation is extremely delicate. In practice, with the mechanical coring devices at present in use, it can only be realized in shallow drill holes.

Accordingly, several attempts have been made in the past in order to determine the angle of the dip and the azimuth of the dip of various geological formations traversed by a bore hole by means of a process similar to "electric coring", the said process consisting in performing electrical measurements inside drill holes.

One of the prior attempts is based on the effects of anisotropy of stratified formation and has been described in a publication entitled: "The Electromagnetic Teleclinometer and Dipmeter" by C. and M. Schlumberger and H. G. Doll; presented at World Petroleum Congress, July 19-25, 1933. This prior method, however is not as accurate or reliable as is desirable, because of the mechanical and physical difficulties attendant upon the operation of the delicate and complicated mechanism that is required, and because of the severe conditions attending practical oil work.

It is therefore an object of my invention to provide a simple and reliable method and apparatus for determining the magnitude and the azimuth of dip of various geological formations traversed by a bore hole.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawings in which:

Figure 1:
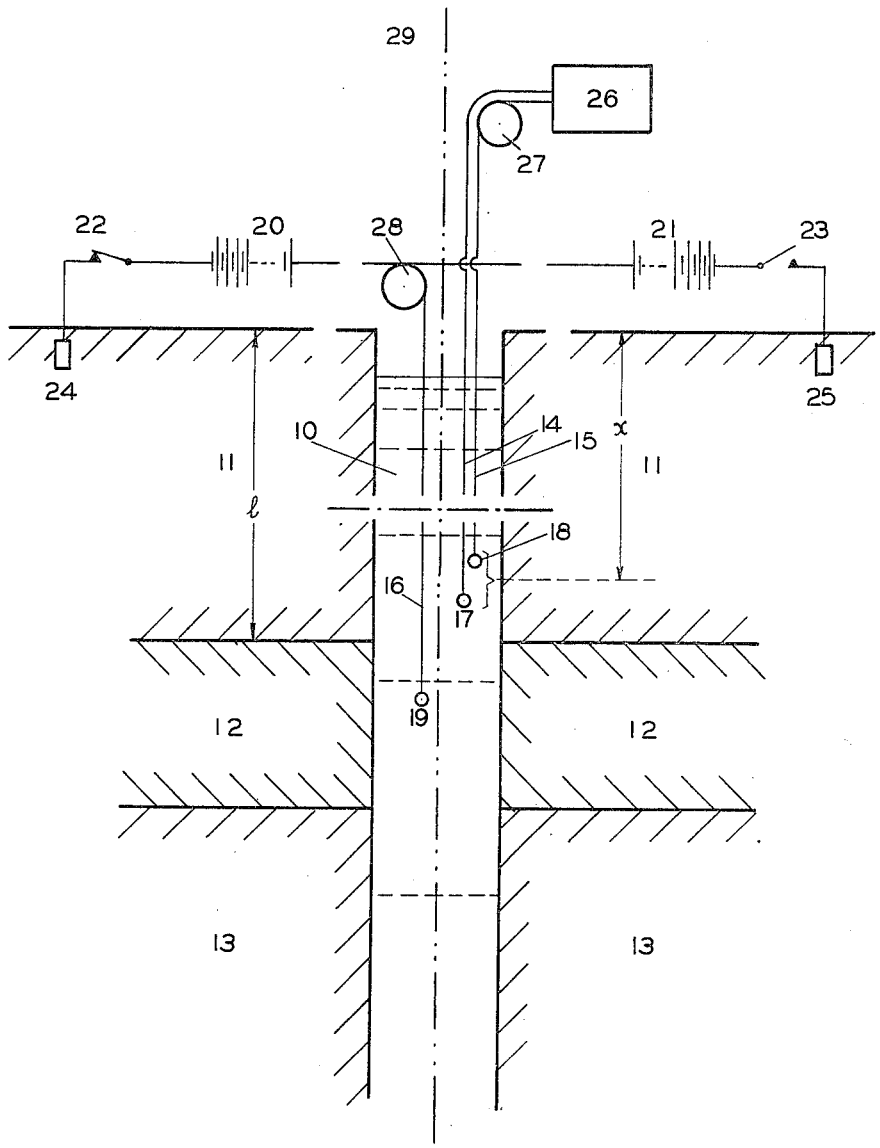
Figure 1 represents an arrangement according to my invention representing a drill hole penetrating a horizontal stratum.

Referring now more particularly to Figure 1. A drill hole 10 is shown penetrating a formation to be explored. The formation has been represented under idealized and simplified conditions as consisting of three sedimentary strata 11, 12, 13 superposed one upon another and which can be differentiated by their electrical resistivities designated as $\rho_{11}$, $\rho_{12}$, $\rho_{13}$, respectively. The strata are assumed to be horizontal.

The exploring apparatus comprises three insulated cables 14, 15, 16 lowered into the drill hole. To them are attached three electrodes 17, 18, 19 which are in contact with the water or mud in the hole. The distances between the electrodes 19—18 and between the electrodes 19—17 are supposed to be great in relation to the diameter of the drill hole.

Electrode 19 is connected by means of cable 16 to positive terminals of batteries 20 and 21 respectively. The negative terminals of these batteries are connected through switches 22 and 23 to the electrodes 24, 25 respectively, the said electrodes being grounded at determined points at the surface of the earth. The electrodes 24 and 25 are situated one opposite to another and at equal distances from the opening of the drill hole, substantially as shown in the figure and arranged in such a manner, that the distance between the electrode 24 and the opening of the hole or the distance between the electrode 25 and the opening of the hole is large in respect to the diameter of the hole, and is of the same order of magnitude as the distance from the electrode 19 to the surface of the earth.

The electrodes 17 and 18 designated hereafter as "exploring electrodes" are connected by means of cables 14 and 15, respectively, to the recorder 26. The recorder is adapted to measure and to record the potential difference between the exploring electrodes.

The cables 14, 15, and 16 have individually a length somewhat in excess of the depth of the hole to be explored and are normally wound on drums 27 and 28 respectively, positioned adjacent to the top of the well.

Figures 2, 3:
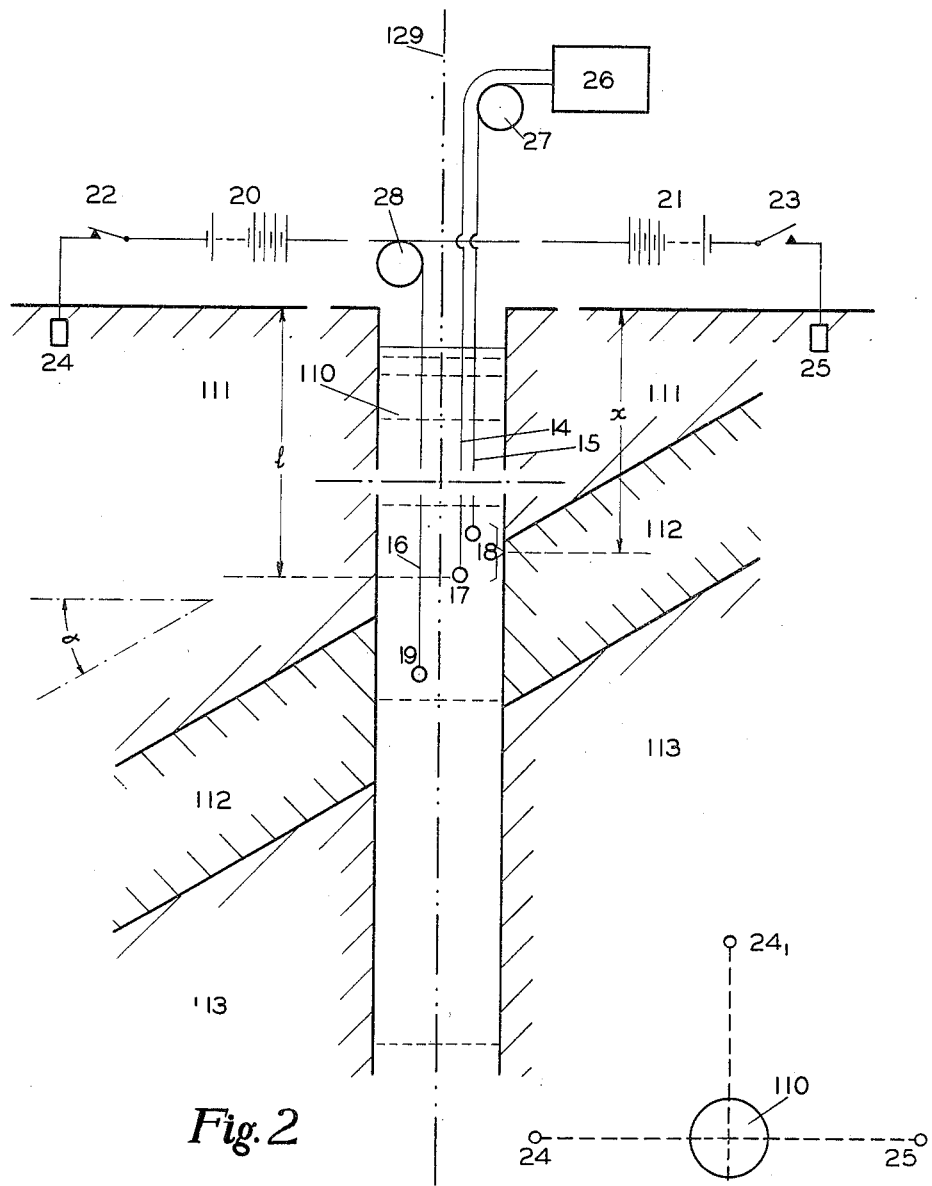
Figure 2 represents an arrangement according to my invention representing a drill hole penetrating an inclined stratum.
Figure 3 represents another arrangement of my invention in a horizontal projection.

Figure 2 represents a drill hole designated by the numeral 110 penetrating a formation different from the one shown in Figure 1. The formation shown in Figure 2 consists of three sedimentary strata designated by 111, 112 and 113. The intermediate formation 112 is inclined at an angle $\alpha$ with respect to the horizontal line in plane of the figure whereas, in Figure 1, the corresponding inclination for the intermediate formation 12 is zero. The resistivities of formations 11, 12, 13 in Figure 1 designated by $\rho_{11}$, $\rho_{12}$, $\rho_{13}$ respectively, are correspondingly equal to the resistivities of formations 111, 112, 113 in Figure 2 designated by $\rho_{111}$, $\rho_{112}$, $\rho_{113}$ respectively. That is: $\rho_{11}=\rho_{111}$; $\rho_{12}=\rho_{112}$; $\rho_{13}=\rho_{113}$. It shall be assumed also that the resistivity of the stratum 112 is smaller than the resistivity of the stratum 111, i. e. $\rho_{112}<\rho_{111}$ or $\rho_{12}<\rho_{11}$.

The exploring apparatus in Figure 2 is identical to the one shown in Figure 1, and similar elements have been designated by the same numerals.

The method shall be described first in connection with Figure 1, and then in connection with Figure 2.

Referring now to Figure 1, assume that the switch 22 is closed, and the switch 23 is open. Then a current is made to flow from the positive terminal of the battery 20 to the electrode 19 lowered in the drill hole, then to traverse the various earth formations as 12 and 11, and to return through the electrode 24 to the negative terminal of the battery 20.

The above current gives rise to a distribution of electrical potential in the drill hole, and which is determined to a considerable extent by the adjoining earth formations. The exploring electrodes 17 and 18 are used for the study of the distribution of the electrical potential by measuring the difference of potential produced by ohmic effect by the passage of current. These differences of potential are plotted graphically for various depths of the hole and from the results obtained the electrical resistivities of the various formations may be determined.

Thus, in the arrangement described by Schlumberger (U. S. Pat. 1,819,923) the resistivity of an earth formation is determined by the following formula:

$$\rho = \frac{4\pi}{i} \Delta v \frac{rr^1}{r^1-r} \qquad (1)$$

where $r$ and $r^1$ are the distances between the electrodes 19 and 18, 19 and 17 respectively, $i$ is the current flowing through the electrode 19, and $\Delta v$ is the difference of potential between the electrodes 17 and 18.

The formula (1) is approximate. In reality, the ground is heterogeneous, and by the application of this formula it is not the specific resistivity, but an apparent resistivity which is obtained.

Assume now that the switch 22 is open and the switch 23 is closed. Then a current is made to flow from the positive terminal of the battery 21 to the electrode 19, then to traverse the various earth formations and to return through the electrode 25 to the negative terminal of the battery 21.

It is apparent, that since the strata 11, 12, 13 are horizontal the present arrangement is symmetrical to the previously described (in which the switch 23 was open and the switch 22 was closed), the line of symmetry being designated by 29. Consequently the current delivered by the battery 21 gives rise to the distribution of electrical potential in the drill hole which is identical to the one previously obtained.

It is therefore apparent that when the earth formation designated by 12 in Figure 1 is horizontal, the current supplied by the battery 20 creates in the drill hole an electrical potential which varies with the depth in a substantially similar manner as the electrical potential created by the current from the battery 21. Consequently, when the switch 22 is closed and 23 is open the difference of potential between the exploring electrodes 17, 18 will vary with the depth in the same manner as when the switch 22 is open and 23 is closed.

Consider now Figure 2 in which the earth formations are not any more symmetrical with regard to the vertical line 129 passing through the drill hole and in which in particular, the formation 112 is inclined at an angle $\alpha$ to the horizontal. As a result of the asymmetry, the current supplied by the battery 20 creates in the drill hole an electrical potential which varies with the depth in a different manner as the electrical potential created by the current from the battery 21.

Let $x$ designate the depth at which the exploring electrodes 17, 18 are suspended, $\Delta v$ the difference of potential between the exploring electrodes, $l$ the depth at which the formation 112 is located. Assume also that the electrode 19 has penetrated the formation 112 and is maintained at a certain fixed position, and that the exploring electrodes are gradually lowered in the hole and approach the formation 112.

Consequently when the switch 22 is closed and 23 is open the difference of potential $\Delta v$ will vary with $x$ in a different manner than when the switch 22 is open and 23 is closed. For the same value of $x$ the apparent resistivity of the earth will be larger in the first than in the second case. This can be explained as follows:

When the switch 23 is closed and the battery 21 is supplying the current, the main path for the current passing from the electrode 19 to the electrode 25 is provided by the low resistance layer 112, and consequently the current traversing the earth in the immediate neighborhood of the exploring electrodes 17, 18 is relatively weak since it is somewhat shunted by the low resistance path offered by the formation 112. Consequently, the voltage $\Delta v$ is relatively small. On the other hand, when the switch 22 is closed and the battery 20 is supplying the current the low resistance layer offered by the stratum 112 is not as effective between the electrodes 19 and 24 as it was in the previous case, because the stratum 112 is directed downwards away from the electrode 24, while in the previous case, it was directed upwards, towards the electrode 25. Consequently, in this case the current traversing the earth in the immediate neighborhood of the exploring electrodes 17, 18 is relatively stronger and the voltage $\Delta v$ is relatively larger than in the previous case.

It is thus seen that by performing two series of electrical measurements within the drill hole: one corresponding to the switch 22 closed and 23 open and the other corresponding to the switch 22 open and 23 closed and comparing the results the slope of the formation 112 in the plane of the figure may be determined. It is therefore obvious that for $x$ approaching $l$ if $\Delta v$ varies in the same manner in both measurements then the angle of inclination $\alpha$ is zero. If however, the variations of $\Delta v$ are different in both measurements the referred earth stratum is inclined at an angle $\alpha$ to the horizontal, and the angle of inclination depends upon the manner in which $\Delta v$ varies in the above measurements.

It is therefore apparent that I have provided a method of determining and measuring the angle of slope of an earth formation traversed by a drill hole, the said angle of slope being contained in a plane passing by the axis of the drill hole 129 and by the points at which the electrodes 24 and 25 are located.

It is often desirable to determine the plane at which the slope of a given earth formation is maximum, i. e. the azimuth of the dip and to determine also the magnitude of the maximum slope, i. e. the angle of the dip.

For this purpose two additional series of measurements are performed which correspond to two different positions of the electrodes 24 and 25. In one of the said additional measurements the switch 22 is closed, 23 is open and the electrode 24 is earthed at a point $24_1$ located on the line $24_1$—$25_1$ perpendicular to the line 24—25. (See Figure 3 showing the arrangement in a horizontal projection.) In the second of the said additional measurements the switch 22 is open, 23 is closed and the electrode 25 is earthed at a point $25_1$ opposite to $24_1$.

It is now obvious to those skilled in the art that by means of the method previously explained, I can determine the slope of a given earth formation in a plane passing through the axis of the drill hole 129 and the points at which the electrodes $24_1$ and $25_1$ are located. It is also obvious to those skilled in the art that by knowing the slopes of the given earth formation in two perpendicular planes intersecting at the axis of the drill hole and passing through the points 24, 25 and the points $24_1$, $25_1$ respectively, I can determine the position of the plane of the dip and the magnitude of the dip of the earth formation.

It is therefore apparent that I have provided a method of and means for determining the angle of the dip and the azimuth of the dip of various geological formations traversed by a bore hole.

In view of my invention and disclosure variations and modifications to meet individual whim or particular need will doubtless become evident to others skilled in the art, to obtain part or all of the benefits of my invention without copying the structure shown, and I, therefore claim all such in so far as they fall within the reasonable spirit and scope of my invention.

In claims the word "plurality" or the word "several" is meant to designate any number larger than one such as for instance, two, three, four, etc.

I claim:

1. In the electrical process for determining inclination of various formations traversed by a bore hole the step of distributing an electrical current field in a determined manner in the said formations and performing measurements of the said electrical current field within the bore hole, the step of distributing an electrical current field in a determined manner which is different from the above said distribution in the said formations and performing the measurements of the said electrical current field distributed in a different manner within the bore hole, the step of comparing the said measurements of the above two steps for determining the inclinations of the said formations.

2. In the electrical process for determining inclination of various formations traversed by a bore hole, the step of producing a current flow through the said formations from a point within the bore hole to a point at the earth's surface at a determined distance from the bore hole and measuring the electrical field at various depths of the bore hole as a result of the said current flow, another step of producing a current flow through the said formations from a point within the bore hole to another point at the earth's surface at a determined distance from the bore hole and measuring the electrical field at various depths of the bore hole as a result of the said current flow in the said other step and the step of comparing the electrical fields in the said first and second steps for determining the inclination of the said formations.

3. In an apparatus for determining inclination of various formations adjacent a drill hole containing an electrically conductive liquid, means for producing a current flow through the said formations from a point within the drill hole to a point at the earth's surface at a determined distance from the drill hole, means for producing a current flow through the said formations from the said point within the drill hole to point at the earth's surface at a determined distance from the drill hole and different from the above first said point at the earth's surface, each of the said current flows producing a distribution of voltage within the drill hole, and means for measuring the said voltage at different points of the drill hole.

4. The method of electrically investigating inclination and dip of various formations traversed by a bore hole containing an electrically conductive liquid, which comprises producing a current flow between an electrode suspended inside the bore hole and an electrode ground at an appropriate distance from the bore hole, and determining the distribution of the electrical potential inside the bore hole for various positions of the grounded electrode.

5. In the electrical process for determining dip of various formations traversed by a bore hole, several steps of producing current flows through the said formations from a point within the bore hole to several points at the earth surface, determining electrical fields caused by each of said current flows and comparing the said electrical fields as a measure of the dip of the referred formations.

6. In the electrical process for determining the inclination of various formations traversed by a bore hole, the first step of producing a current flow through the said formations from a point located at a determined depth within the bore hole to a point at the earth's surface at a determined distance from the bore hole and measuring the electrical field of the bore hole as a result of the said current flow, the second step of producing a current flow through the said formations from the said point within the bore hole to another point at the earth's surface at a determined distance from the bore hole and measuring the electrical field of the bore hole as a result of the said current flow in the said second step, the third step for comparing the electrical fields in the said first and the said second steps for determining the inclination of the said formations, and repeating the said first, second and third step for various depths of the said point located within the bore hole.

JACOB NEUFELD.